Aug. 12, 1924.

E. U. LANDGRAFF 1,504,356

WRINGING APPARATUS FOR SCRUBBING CLOTHS AND MOP CLOTHS

Filed Nov. 9, 1923

Inventor
E. U. Landgraff
by Langner, Parry, Card & Langner
Attys.

Patented Aug. 12, 1924.

1,504,356

UNITED STATES PATENT OFFICE.

ERNST ULRIK LANDGRAFF, OF CHRISTIANIA, NORWAY.

WRINGING APPARATUS FOR SCRUBBING CLOTHS AND MOP CLOTHS.

Application filed November 9, 1923. Serial No. 673,843.

*To all whom it may concern:*

Be it known that I, ERNST ULRIK LANDGRAFF, a subject of the King of Norway, residing at Uranienborg Terrasse 10, Christiania, Norway, have invented certain new and useful Improvements in Wringing Apparatus for Scrubbing Cloths and Mop Cloths; and I do hereby declare the following to be a full, clear, and exact description of the invention, such as will enable others skilled in the art to which it appertains to make and use the same, reference being had to the accompanying drawings and to letters or figures of reference marked thereon, which form a part of this specification.

My invention relates to a wringing apparatus for scrubbing cloth and mop-cloth of the kind in which the cloth passes between two rollers in the same way as in a wringing machine. The object of my invention is to provide an apparatus of this kind applicable to a bucket of the usual form and easily handled so as to avoid gripping the cloth with the hands.

An executional form of the invention is shown in the accompanying drawings in which.

Figure 1:
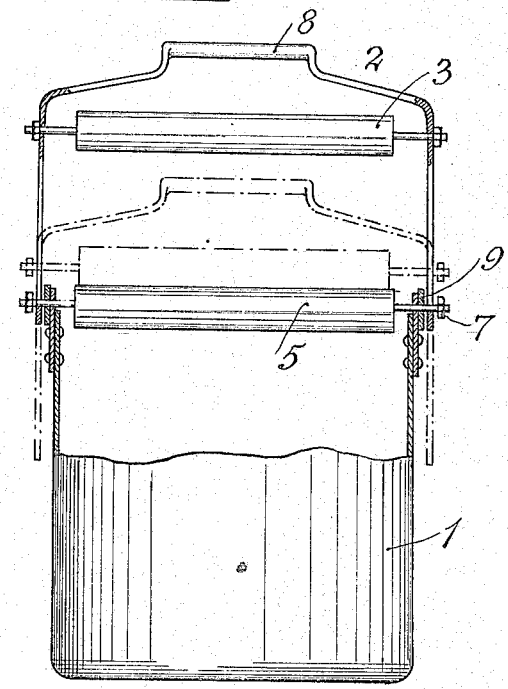
Fig. 1 is a side view partly in section of the apparatus.

The apparatus is used in connection with a bucket 1 of any ordinary form. It consists of a bail 2 to which is revolvably fastened a roller 3 suitably covered with rubber. A similar roller 5 is revolvably fastened in the ears or handle plates 4 of the bucket and the bail 2 is provided with two longitudinal slots 6 through which the ends of the elongated shaft 7 of the roller 5 protrude. The bail 2 also serves as the handle of the bucket and for this purpose has its upper part formed as a grip 8.

Figure 2:
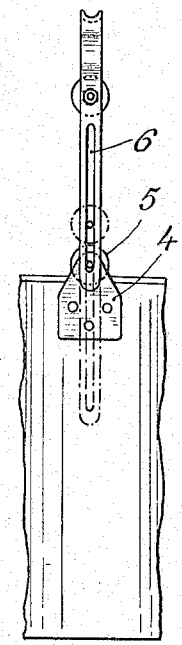
Fig. 2 is a corresponding view at right angles.

The apparatus is specially adapted for use in connection with a scrubbing cloth holder on a handle and is used in the following way:

The scrubbing cloth to be wrung out is inserted in the space between the two rollers 3 and 5 so as to remain hanging across the latter roller. Thereupon the bail is pressed towards the position indicated in dotted lines in Figs. 1 and 2, and the two rollers then will form a wringing machine, the pressure of which may be controlled by the hand, the wringing of the scrubbing cloth being effected through merely drawing the same out between the rollers. In order to prevent noise during this operation packings 9 may suitably be inserted between the ears of the bucket and the bail 2.

This wringing apparatus may obviously be applied to any ordinary form of bucket.

Claims:

1. A combined mop pail and wringer, comprising, a bucket, a bail like handle, a roller journaled in said handle, longitudinal guide slots in the arms of said handle, projections on the bucket engaging said slots to permit sliding movement of the handle thereon, and a second roller journaled on said bucket and so positioned as to be brought into working contact with the first roller upon the lowering of the handle along said projections.

2. A combined mop pail and wringer, comprising, a bucket, a bail like handle, a roller journaled in said handle, longitudinal guide slots in the arms of said handle, a second roller journaled in said bucket, elongated projections on the second roller engaging the guide slots of the handle, the second roller being positioned so as to be brought into working contact with the first roller upon the lowering of the handle along said projections.

In testimony that I claim the foregoing as my invention, I have signed my name in the presence of two subscribing witnesses.

ERNST ULRIK LANDGRAFF.

Witnesses:
 MAGENS BERGER,
 OLGA MÜLLER.